United States Patent [19]
Massey

[11] Patent Number: 6,113,337
[45] Date of Patent: Sep. 5, 2000

[54] VEHICLE RESTRAINT

[75] Inventor: Douglas H. Massey, New Berlin, Wis.

[73] Assignee: Kelley Company, Inc., Mequon, Wis.

[21] Appl. No.: 09/164,895

[22] Filed: Oct. 1, 1998

[51] Int. Cl.[7] ................................................ B65G 69/00
[52] U.S. Cl. .............................................................. 414/401
[58] Field of Search ............................................. 414/401

[56] References Cited

U.S. PATENT DOCUMENTS

| | | | |
|---|---|---|---|
| 4,264,259 | 4/1981 | Hipp | 414/401 |
| 4,472,099 | 9/1984 | Hahn et al. | 414/401 |
| 4,674,941 | 6/1987 | Hageman | 414/401 |
| 4,759,678 | 7/1988 | Hageman | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |

Primary Examiner—Steven A. Bratlie
Attorney, Agent, or Firm—Michael Best & Friedrich LLP

[57] ABSTRACT

A vehicle restraint adapted to be used at a loading dock to restrain a vehicle during loading and unloading operations. The restraint includes a carriage adapted to be mounted to the loading dock, and a restraining member (e.g., a hook) connected to the carriage. The carriage is movable relative to the loading dock between an inoperative position and an operative position that is typically higher than the inoperative position, and is biased towards the operative position when in the operative position. The restraining member is movable relative to the carriage between a restraining position and a nonrestraining position. The restraining member is capable of restraining an ICC bar when in the restraining position, and is biased toward the restraining position independent of the bias of the carriage.

18 Claims, 4 Drawing Sheets

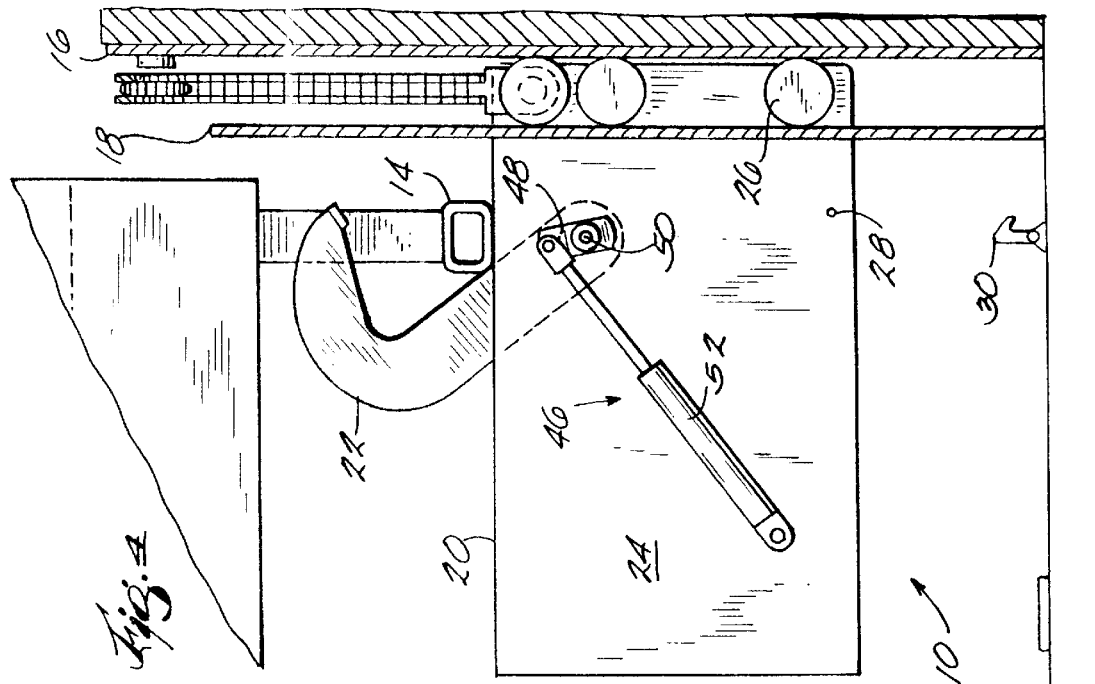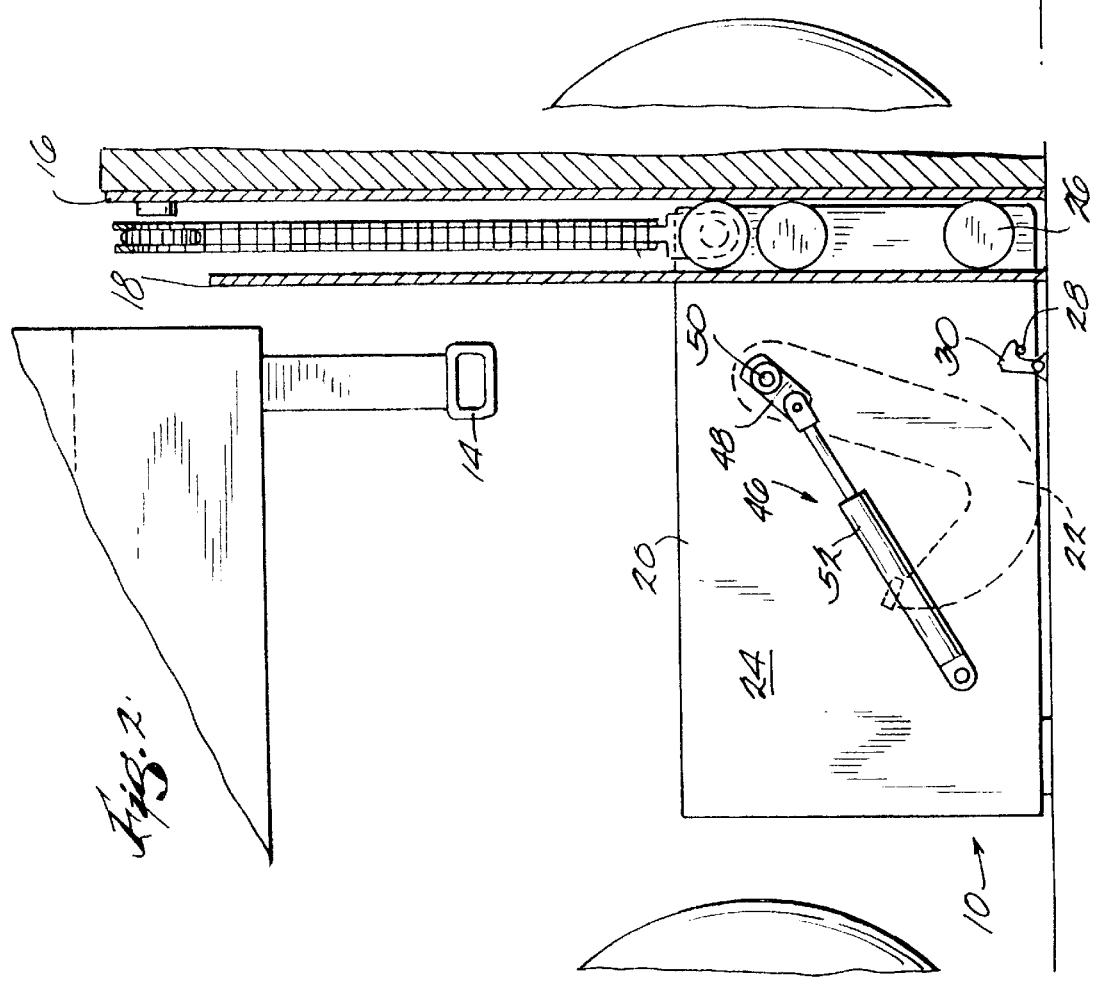

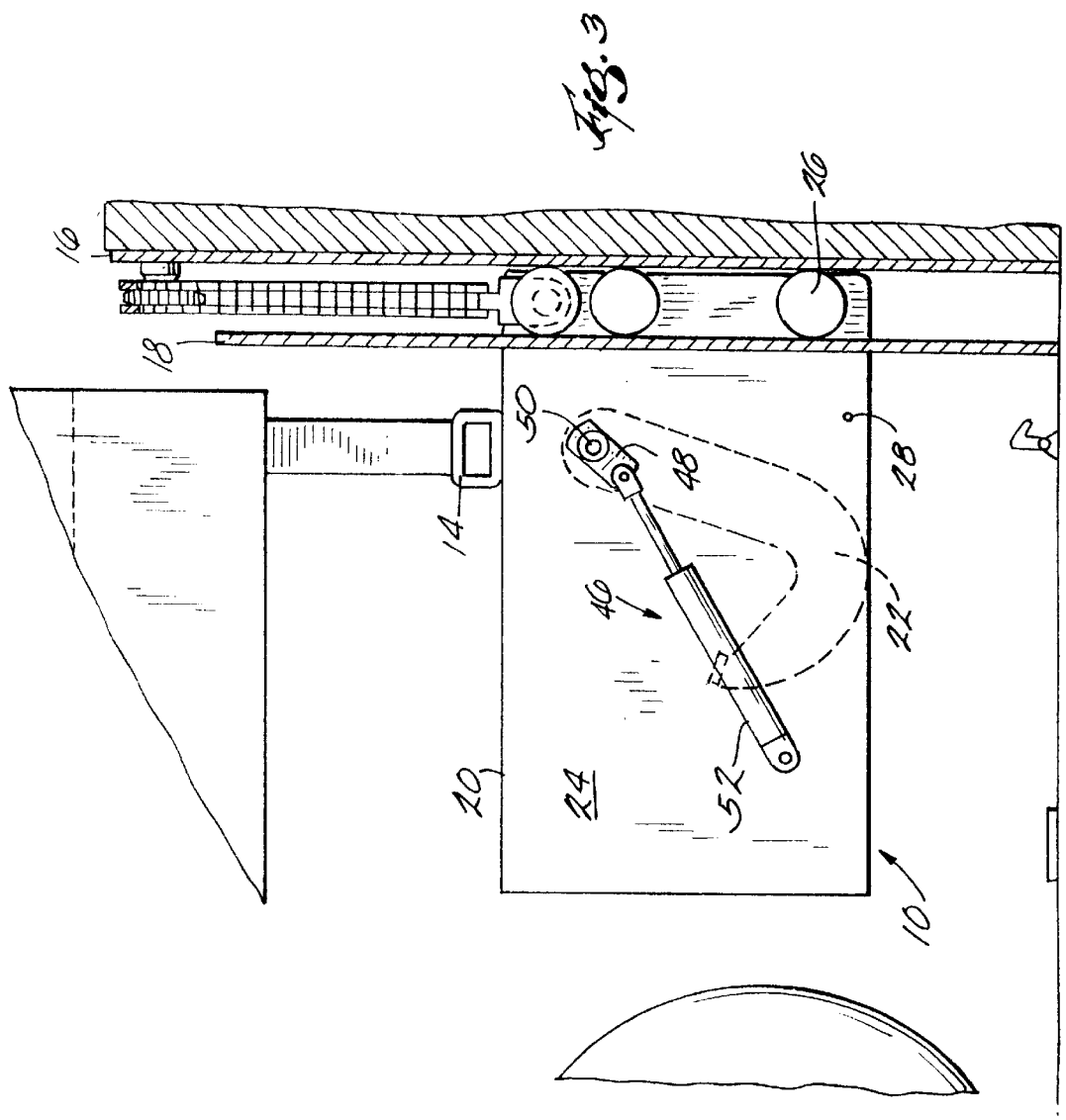

VEHICLE RESTRAINT

FIELD OF THE INVENTION

The present invention generally relates to the field of vehicle restraints that restrain a vehicle at a loading dock during loading and unloading operations.

BACKGROUND OF INVENTION

Vehicle restraints increase the safety of loading and unloading trucks at a loading dock. After backing into a loading dock, the truck driver often cannot see the workers loading and unloading cargo from behind. The workers then, sometimes driving forklifts, become vulnerable to accidental movement of the truck away from the loading dock. Federal regulations require that all trucks have an ICC bar spanning across its back end, below the bed. By locking onto the ICC bar with a hook, the vehicle restraint prevents movement of the truck away from the loading dock.

One type of vehicle restraint is commonly called an "impact-style" restraint, such as that disclosed in U.S. Pat. No. 4,264,259 (the '259 patent). The restraint includes an upwardly biased carriage vertically movable along a track between a highest position, where the carriage is stored, and a lowest position. The restraint also includes a power-driven hook used to restrain (e.g., engage) the ICC bar, and the carriage includes two cammed walls between which the hook lies recessed when it is not in the restraining position.

The vehicle restraint in the '259 patent becomes operative when the ICC bar of a vehicle backing into the loading dock contacts the cammed walls of the carriage, forcing the carriage downward along the tracks. The carriage comes to an equilibrium position once the ICC bar reaches the horizontal top face of the cammed walls. After the ICC bar is in place, the hook is actuated. Upon actuation, the hook emerges from the carriage to restrain the ICC bar.

The upwardly biased carriage in the '259 restraint assists the restraint in remaining engaged with the ICC bar. During a loading or unloading of a vehicle, float caused by movement of forklifts, workers, and cargo can change the vehicle's vertical position relative to the drive surface up to ten inches between its heaviest and lightest loads. The upward bias on the carriage maintains the restraint in contact with the ICC bar so that the hook remains engaged with the ICC bar as the truck bed floats.

A major drawback of the '259 reference, however, lies in the initial contact between the ICC bar and the cammed walls of the vehicle restraint. This contact can potentially burden the vehicle restraint with harmful wear and tear. At the same time, the ICC bar can become damaged through deformation when objects or debris lodged in the tracks impede the downward motion of the carriage. Not only does a damaged ICC bar run the risk of being out of compliance with federal regulations, but also, once the damage becomes significant, even an upwardly biased carriage may not bring the hook within range of the ICC bar.

SUMMARY OF THE INVENTION

The present invention provides a vehicle restraint that is adapted to be used at a loading dock to restrain a vehicle during loading and unloading operations. The restraint includes a carriage adapted to be mounted to the loading dock, and a restraining member (e.g., a hook) connected to the carriage. The carriage is movable relative to the loading dock between an inoperative position and an operative position that is higher than the inoperative position, and is biased towards the operative position when in the operative position (e.g., by a carriage biasing member in the form of a gas spring or other suitable mechanism). The restraining member is movable relative to the carriage between a restraining position and a nonrestraining position. The restraining member is capable of restraining an ICC bar when in the restraining position, and is biased toward the restraining position (e.g., by a hook-biasing member in the form of a gas spring or other suitable mechanism) independent of the bias of the carriage.

In one embodiment, the vehicle restraint further includes a base member attachable to the loading dock, wherein the carriage is connected to the base member. Preferably, the base member includes a track, and the carriage is movable along the track.

In another aspect of the invention, the carriage is biased toward the operative position when in the inoperative position, and the restraining member is recessed in the carriage when in the nonrestraining position. For example, the carriage can include two side walls defining a recess, and the restraining member can be positioned in the recess when in the nonrestraining position.

BRIEF DESCRIPTION OF THE DRAWINGS

FIG. 2 is a side view of the vehicle restraint with the carriage in an inoperative position and the hook in the non-restraining position.

FIG. 3 is a side view of the vehicle restraint with the carriage in an operative position and the hook in a non-restraining position.

FIG. 4 is a side view of the vehicle restraint with the carriage in an operative position and the hook in a restraining position.

DETAILED DESCRIPTION

Figure 1:
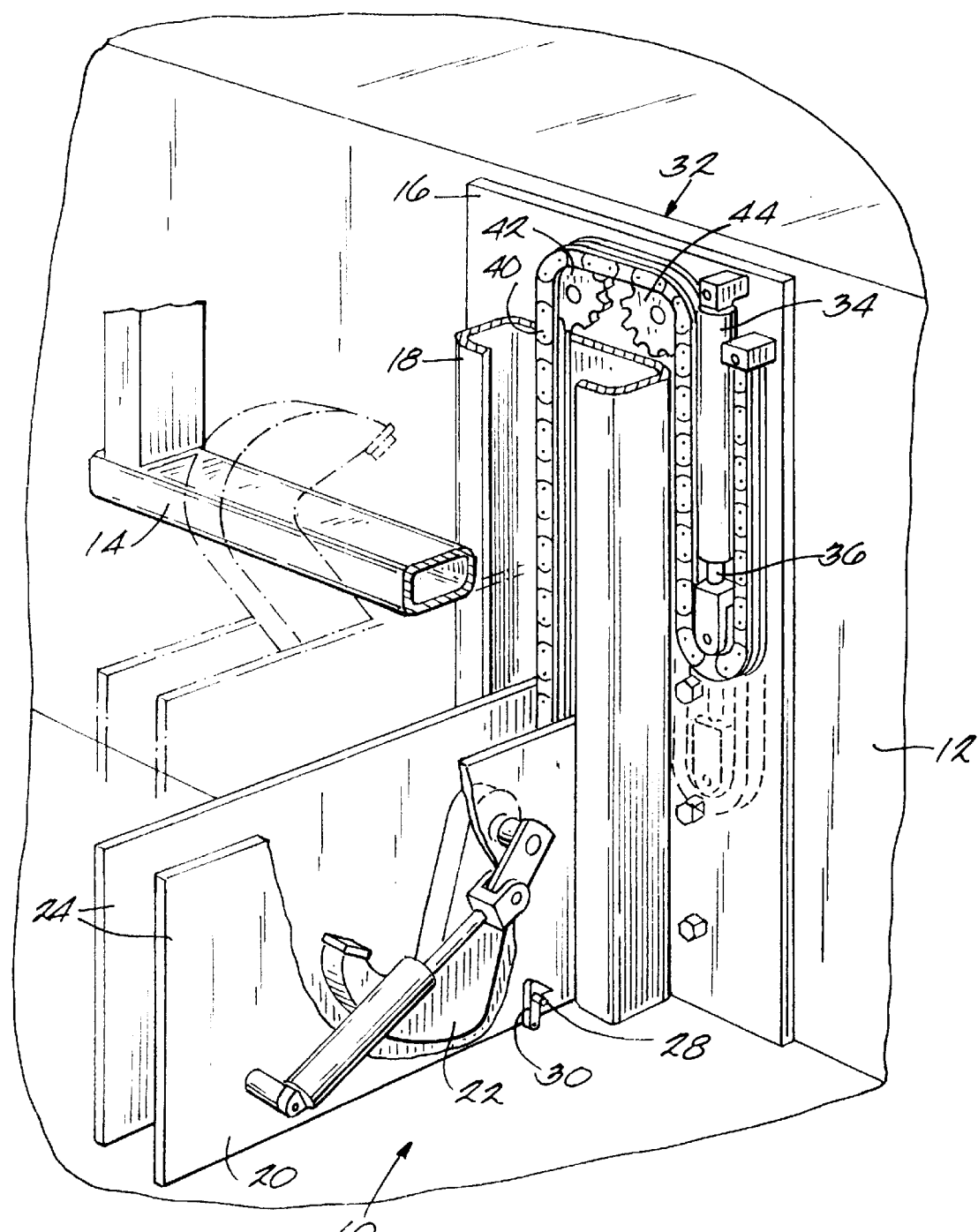
FIG. 1 is a perspective view of a vehicle restraint embodying the present invention.

The drawings illustrate a vehicle restraint 10 mounted on a dock face 12. The vehicle restraint 10 is adapted to engage a vehicle ICC bar 14 once the vehicle is backed against the dock. The illustrated restraint generally includes a base member 16 mounted to the dock face 12, a track 18 secured to the base member 16, an upwardly biased carriage 20 mounted for vertical movement along the track 18, and restraining member in the form of a hook 22 pivotally mounted on the carriage 20.

The carriage 20 has two parallel walls 24 defining a recess in which the hook 22 is positioned. Wheels 26 are connected to the walls 24 and travel in the track 18 to facilitate vertical movement of the carriage 20 relative to the dock face 12 between an inoperative position (FIG. 2) and an operative position (FIGS. 3 and 4). A pin 28 is mounted to a lower portion of one wall. The pin 28 is designed to be engaged by a latch 30 to facilitate holding the carriage 20 in the inoperative position. Preferably, the latch 30 is biased toward the latched position and includes a beveled top surface to facilitate automatic latching of the pin 28. The illustrated latch 30 can be moved manually to released engagement with the pin 28. Alternatively, the latch 30 can be connected to an actuator, such as a solenoid or piston/cylinder arrangement, to facilitate moving the latch 30.

Figure 6:
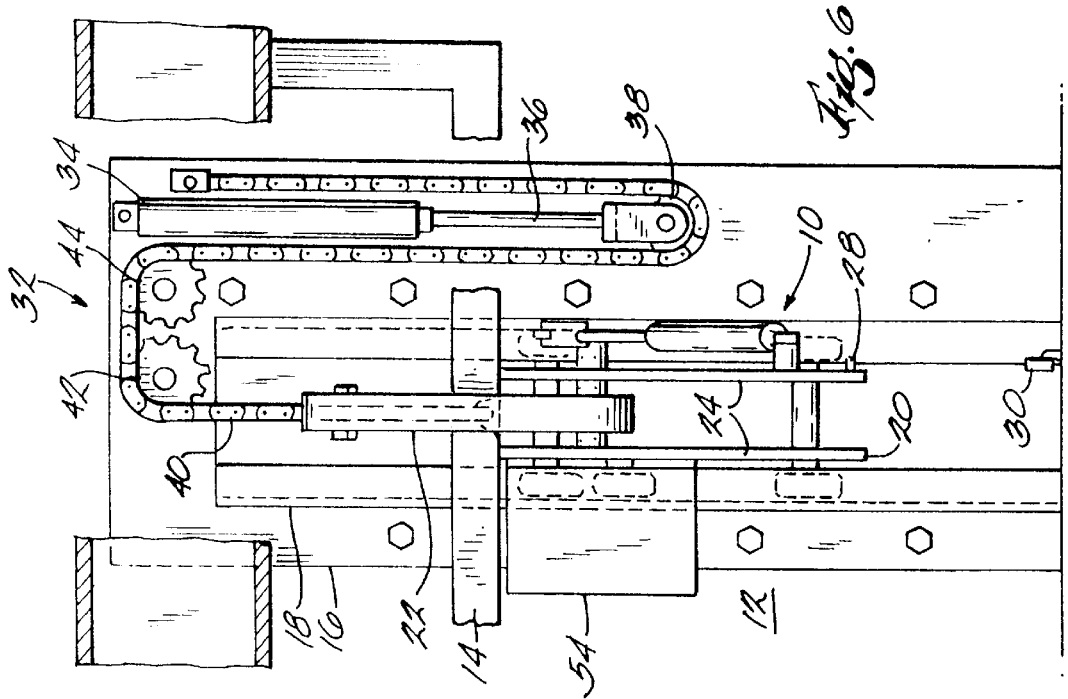
FIG. 6 is a front view of the vehicle restraint with the carriage in the operative position and the hook in the restraining position.
Figure 5:
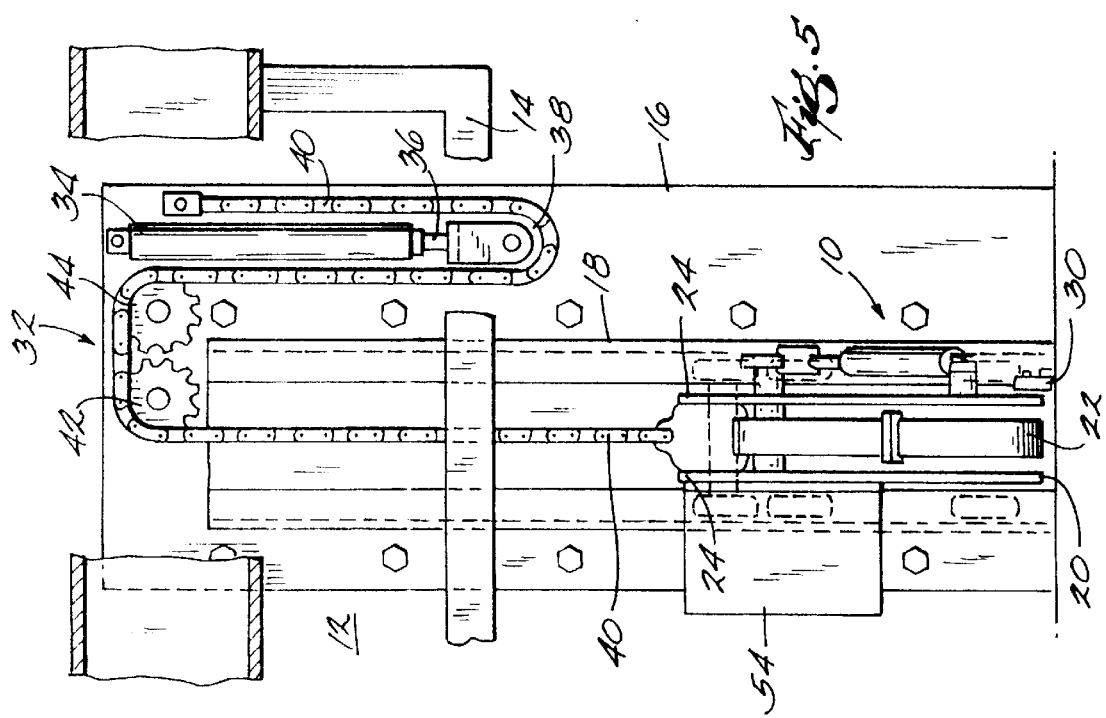
FIG. 5 is a front view of the vehicle restraint with the carriage in the inoperative position.

As shown in FIGS. 1, 5, and 6, a biasing member in the form of a gas spring assembly 32 is connected to the base member 16 and the carriage 20. The gas spring assembly 32 keeps the carriage 20 upwardly biased (i.e., biased toward the operative position) even while it is in an inoperative position. The gas spring assembly 32 includes a cylinder 34 and a rod 36 slidably positioned within the cylinder 34. The cylinder 34 contains a pressurized gas, which creates a biasing force that biases the rod 36 away from the cylinder 34 along a line of force directed along the longitudinal axis of the rod 36. The end of the cylinder 34 is attached to the base member 16, and the end of the rod 36 supports a pulley 38. A mechanical compression, tension, or torsional spring could be substituted for the gas spring assembly 32, and these types of biasing members are within the scope of the invention. The gas spring assembly 32 further includes a flexible member in the form of a chain 40, which is used to transfer bias force from the cylinder 34 and rod 36 to the carriage 20. One end of the chain 40 is attached to the carriage 20 and is supported by a pulley 42. Another pulley 44 guides the chain 40 towards the pulley 38 attached to the end of the rod 36. The other end of the chain 40 is attached to the base member 16. Instead of a chain, a cable, rope, or other appropriate member could be used.

Movement of the illustrated carriage 20 from the inoperative position to the operative position is accomplished by the force of the gas spring assembly 32. Movement from the operative to the inoperative position can be performed manually by pushing down on the carriage 20 (e.g., by using a long rod). Alternatively, the carriage 20 can be connected to one of a variety of actuators to move the carriage 20 to the inoperative position. For example, a pneumatic cylinder, hydraulic cylinder, electric motor, or linear actuator can provide the force required to move the carriage 20.

Referring to FIGS. 2 and 3, the restraint includes a hook biasing assembly 46 for biasing the hook 22. The hook biasing assembly generally includes a lever 48 secured to a shaft 50 on which the hook 22 is mounted, and a biasing member in the form of a gas spring 52 connected to the lever 48. When the hook 22 is in the non-restraining position (FIGS. 2 and 3) it can be seen that the gas spring 52 will bias the hook 22 to stay in the non-restraining position. When the hook 22 is in the restraining position (FIG. 4), the gas spring 52 will bias the hook 22 to stay in the restraining position. The hook 22 is driven between the non-restraining and restraining positions by a power mechanism in the form of an electric motor 54. U.S. patent application Ser. No. 09/042,761 discloses the parts and operation of the hook biasing assembly 46 and motor 54 in detail and is incorporated by reference in its entirety for that purpose.

In operation, the restraint 10 is stored with the carriage 20 in the inoperative position (FIGS. 2 and 5). In this position, the carriage 20 is biased upward by the gas spring assembly 32, but is held down by the latch 30 engaged with the pin 28. The hook 22 is initially stored in the non-restraining position. Once the vehicle backs into the loading dock and positions the ICC bar 14 over the restraint 10, the carriage 20 is actuated by disengaging the latch 30 from the pin 28. This allows the carriage 20 to move upward, due to the biasing force of the gas spring assembly 32, until the carriage 20 contacts the ICC bar 14 (FIG. 3). In this condition, the carriage 20 will float with the movement of the vehicle as it is unloaded or loaded. Because of the biasing of the gas spring assembly 32 towards the operative position, the carriage 20 will always bear against the ICC bar 14.

The hook 22 is actuated after the carriage 20 is in the operative position. The motor 54 is actuated to rotate the hook 22. As described in U.S. patent application Ser. No. 09/042,761, once the hook 22 is over-center, the gas spring 52 takes over and rotates the hook 22 until it engages the ICC bar 14 or reaches full-up position. Similar to the carriage 20, the hook 22 is biased towards the restraining position and will float with the movement of the vehicle as the vehicle is unloaded or loaded. The hook 22 will always bear against the ICC bar 14, and will restrain the ICC bar 14, resisting movement of the vehicle away from the dock.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses or the present invention. It is intended that the appended claims be construed to include alternative embodiments to the extent permitted by the prior art.

What is claimed is:

1. A vehicle restraint adapted to be used at a loading dock to restrain a vehicle during loading and unloading operations, said restraint comprising:

a carriage adapted to be mounted to the loading dock and movable relative to the loading dock between an inoperative position and an operative position that is higher than the inoperative position, and being biased towards the operative position when in the operative position; and a restraining member connected to said carriage and movable relative to said carriage between a restraining position and a nonrestraining position, said restraining member being capable of restraining an ICC bar when in the restraining position, and said restraining member being biased toward the restraining position independent of the bias of said carriage.

2. The vehicle restraint in claim 1, further comprising:

a base member attachable to the loading dock, said carriage being connected to said base member.

3. The vehicle restraint in claim 2, wherein said base member includes a track, said carriage being movable along said track.

4. The vehicle restraint in claim 1, further comprising:

a carriage biasing member for biasing said carriage.

5. The vehicle restraint of claim 4, wherein said carriage biasing member comprises a gas spring.

6. The vehicle restraint of claim 4, further comprising:

a flexible element for transmitting force from said carriage biasing member to said carriage.

7. The vehicle restraint of claim 1, further comprising:

a biasing member for biasing said restraining member.

8. The vehicle restraint of claim 7, wherein said biasing member comprises a gas spring.

9. The vehicle restraint of claim 7, wherein said biasing member is operatively located between said carriage and said restraining member.

10. The vehicle restraint of claim 1, wherein said restraining member is pivotally mounted to said carriage.

11. A vehicle restraint adapted to be used at a loading dock to restrain a vehicle during loading and unloading operations, said restraint comprising:

a carriage adapted to be mounted to the loading dock and movable relative to the loading dock between an inoperative position and an operative position that is higher than the inoperative position, and being biased towards the operative position while in the inoperative position; and a restraining member connected to said carriage and movable relative to said carriage between a restraining position and a nonrestraining position, said restraining member being capable of restraining an ICC bar when in the restraining position, and being recessed in said carriage when in the nonrestraining position.

12. The vehicle restraint in claim 11, further comprising:

a base member attachable to the loading dock, said carriage being connected to said base member.

13. The vehicle restraint in claim 12, wherein said base member comprises a track, said carriage being movable along said track.

14. The vehicle restraint in claim 11, further comprising:

a carriage biasing member for biasing said carriage.

15. The vehicle restraint of claim 14, wherein said carriage biasing member comprises a gas spring.

16. The vehicle restraint of claim 14, further comprising:

a flexible element for transmitting force from said carriage biasing member to said carriage.

17. The vehicle restraint of claim 11, wherein said carriage includes two side walls defining a recess, said restraining member being positioned in said recess when in the nonrestraining position.

18. The vehicle restraint of claim 11, wherein said restraining member is pivotally mounted to said carriage.

* * * * *